(12) United States Patent
Chen

(10) Patent No.: US 12,743,962 B2
(45) Date of Patent: Sep. 22, 2026

(54) SCREENLESS TEACHING APPARATUS

(71) Applicant: Netanel Chen, Giv'at Ze'ev (IL)

(72) Inventor: Netanel Chen, Giv'at Ze'ev (IL)

( * ) Notice: Subject to any disclaimer, the term of this patent is extended or adjusted under 35 U.S.C. 154(b) by 495 days.

(21) Appl. No.: 18/195,388

(22) Filed: May 10, 2023

(65) Prior Publication Data

US 2023/0368692 A1 Nov. 16, 2023

(30) Foreign Application Priority Data

May 11, 2022 (IL) .......................................... 292963

(51) Int. Cl.
*G09B 7/00* (2006.01)

(52) U.S. Cl.
CPC ..................................... *G09B 7/00* (2013.01)

(58) Field of Classification Search
CPC ... G09B 7/00; G09B 5/00; G09B 5/06; G09B 5/062; A63F 9/183
See application file for complete search history.

(56) References Cited

U.S. PATENT DOCUMENTS

| | | | | |
|---|---|---|---|---|
| 4,681,548 A * | 7/1987 | Lemelson | G09B 7/06 | D14/340 |
| 10,755,596 B1 * | 8/2020 | Rudie | G09B 19/00 | |
| 2004/0198438 A1 * | 10/2004 | Song | G09B 5/062 | 455/556.1 |
| 2005/0186547 A1 * | 8/2005 | Yang | G09B 5/062 | 434/308 |
| 2010/0066071 A1 * | 3/2010 | Kelaidis | G09B 5/062 | 412/1 |
| 2012/0185269 A1 * | 7/2012 | Kerrigan | G09B 19/00 | 705/2 |
| 2013/0316321 A1 * | 11/2013 | Herz | G09B 5/062 | 29/829 |

* cited by examiner

*Primary Examiner* — Eddy Saint-Vil
(74) *Attorney, Agent, or Firm* — AlphaPatent Associates Ltd.; Daniel J. Swirsky

(57) ABSTRACT

Teaching apparatus including a casing (10) having on an upper side thereof a plurality of buttons (11), a sheet (13) having a plurality of images (14) impressed thereon, each of the images used as a response to a question, a data storage media (22), for storing one or more questions to each of the responses, where each of the buttons is used as indicator to an image pointed by a user, and a processor for displaying each of the questions, receiving a response provided by a user through one of the buttons, and playing feedback thereof.

13 Claims, 5 Drawing Sheets

SCREENLESS TEACHING APPARATUS

TECHNICAL FIELD

The invention relates generally to the field of technological devices for teaching.

BACKGROUND

Today screens are widely used in computers, mobile phones and tablets. The result of intensive use of screens is eye strain due to the flickering of the display and the sharpness of the image. People may not be aware of these phenomena due to the common use of screens. However, the problem exists and may strain the eye even if one is not aware of the problem. The problem is particularly serious among young people, and increased use of screens may cause vision impairment.

As a result of the drawbacks of using screens, there is a long felt need to solutions to the above detailed problems, especially in teaching means.

SUMMARY

In one aspect, the invention is directed to a teaching apparatus, comprising a casing (10) having on an upper side thereof a plurality of buttons (11), a sheet (13) having a plurality of images (14) impressed thereon, each of the images used as a response to a question, a data storage media (22), for storing one or more questions to each of the responses, wherein each of the buttons is used as indicator to an image pointed by a user, and a processor for displaying each of the questions, receiving a response provided by a user through one of the buttons, and playing feedback thereof.

According to embodiments of the invention, at least one of the buttons is a mechanic sensor, sensing a mechanical press thereon a user thereto.

According to embodiments of the invention, at least one of the buttons is a proximity sensor, sensing a proximity of a finger of a user thereto.

According to embodiments of the invention, the data storage media is a removable memory card.

According to embodiments of the invention, the data storage media is a compact disk.

According to embodiments of the invention, the data storage media is a remote server accessible through the internet.

According to embodiments of the invention, the sheet further comprises an ID of the sheet.

The apparatus according to claim 7, wherein the buttons comprise an impression of a digit, for providing an ID of the sheet to the processor by clicking the buttons correspondingly.

According to embodiments of the invention, the ID is in a form of a code.

According to embodiments of the invention, the code is in a form of barcode.

According to embodiments of the invention, the code is in a form of QR-code.

According to embodiments of the invention, the code is in a form of text and the apparatus comprises a text recognition facility thereof.

According to embodiments of the invention, the questions are stored in the data storage media in a form of audio signal.

According to embodiments of the invention, the questions are stored in the data storage media in a form of text and converted to audio signal by a text-to-audio facility of the apparatus.

According to embodiments of the invention, the sheet is made of paper.

According to embodiments of the invention, the sheet is made of plastic.

According to embodiments of the invention, the sheet is elastic, thereby when the buttons are mechanical buttons the sheet does not wrinkle.

According to embodiments of the invention, on the sheet are impressed also functional buttons.

According to further embodiments of the invention, the apparatus further comprising a fence (12), for preventing said sheet (13) from unintentional movement.

The reference numbers have been used to point out elements in the embodiments described and illustrated herein, in order to facilitate the understanding of the invention. They are meant to be merely illustrative, and not limiting. Also, the foregoing embodiments of the invention have been described and illustrated in conjunction with systems and methods thereof, which are meant to be merely illustrative, and not limiting.

BRIEF DESCRIPTION OF THE DRAWINGS

Embodiments, features, and aspects of the invention are described herein in conjunction with the following drawings.

It should be understood that the drawings are not necessarily drawn to scale.

DETAILED DESCRIPTION

The invention will be understood from the following detailed description of various embodiments thereof, which are meant to be descriptive and not limiting. For the sake of brevity, some well-known features, methods, systems, procedures, components, circuits, and so on, are not described in detail.

A "lesson" is defined herein as a series of questions and responses of a user (student) by touching an image.

Figure 1:
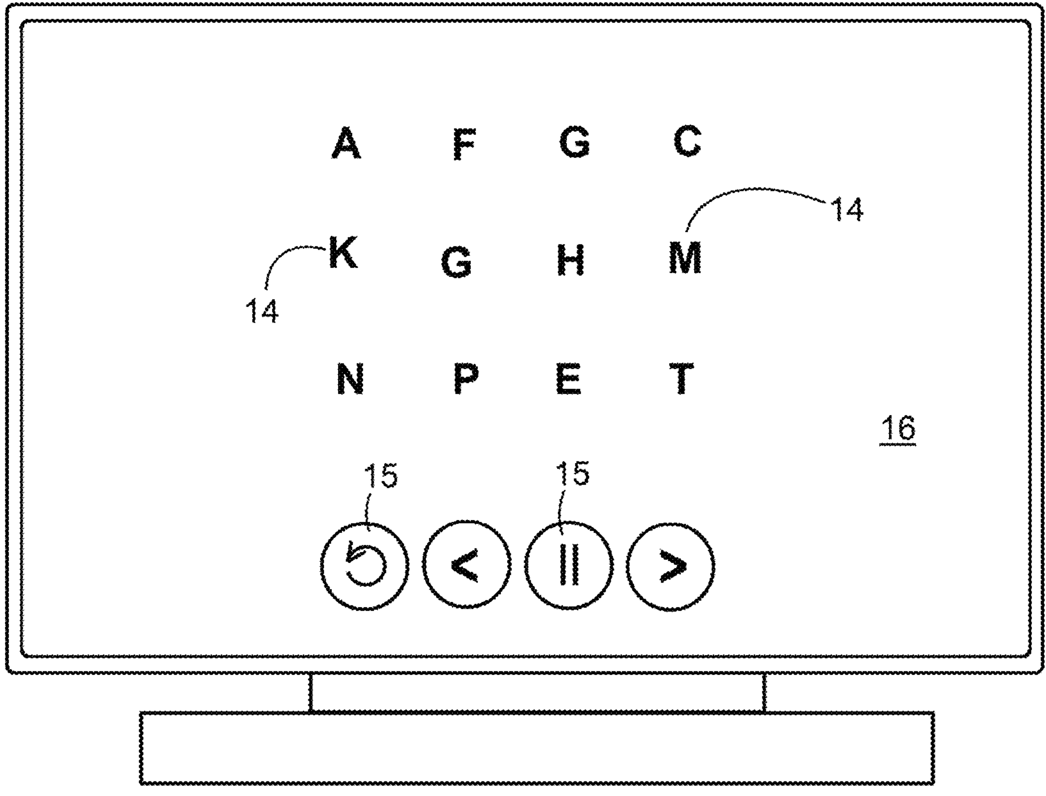
FIG. 1 schematically illustrates a computer display of a lesson of practicing letters recognition, according to the prior art.

FIG. 1 schematically illustrates a computer display of a lesson of practicing letters recognition, according to the prior art.

The screen is a touch screen, i.e., the touching coordinates are provided to a corresponding software running on a computer.

A plurality of letter (character) images 14 is impressed on the screen 16. The computer reads aloud a letter, and the student, such as a young kid that learns reading, has to touch with his finger on a corresponding instance of the displayed letter on the screen. The display may comprise several instances of each letter. If the student touches the expected letter, the computer sounds a "well done" message.

This scenario may be repeated several times. Of course, the student may pause the lesson, end the lesson, etc. with corresponding control keys 15.

Figure 2A:
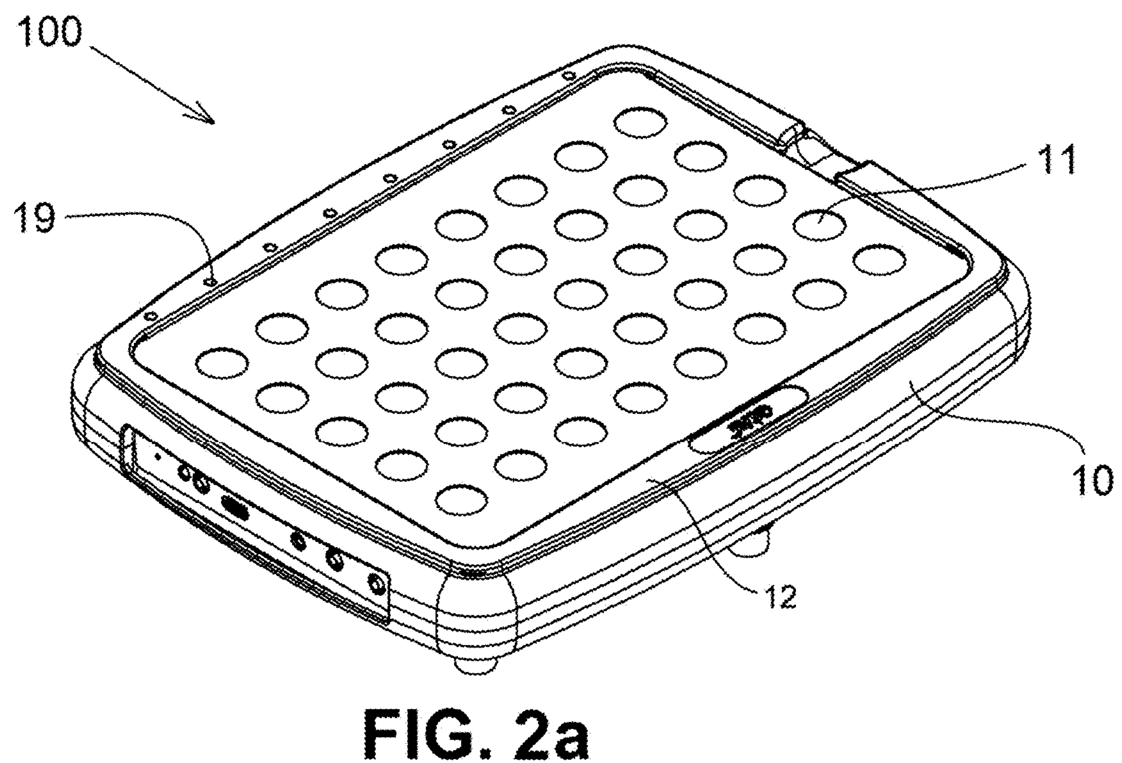
FIG. 2*a* schematically illustrates a screenless teaching apparatus, according to embodiments of the invention.

FIG. 2 schematically illustrates a screenless teaching apparatus, according to embodiments of the invention.

Figure 2B:
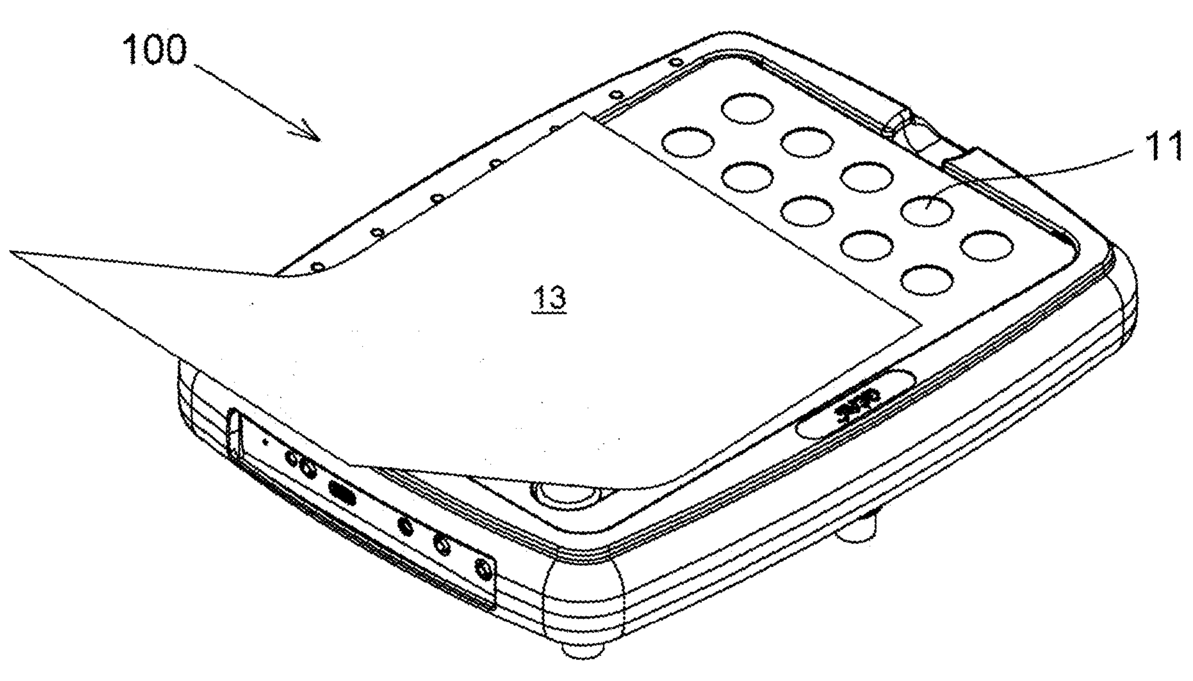
FIG. 2*b* schematically illustrates a screenless teaching apparatus on which is placed a sheet, according to embodiments of the invention.

FIG. 2*b* schematically illustrates a screenless teaching apparatus on which is placed a sheet, according to embodiments of the invention.

According to embodiments of the invention, the screen of the prior art is replaced by a printed sheet of, e.g., paper or plastic, laid down on an apparatus which comprises a plurality of buttons. When a student touches an image of the sheet, he actually activates a button of the apparatus. The apparatus is programmed to act according to the activated buttons.

The screenless teaching apparatus, which is marked herein by reference numeral 100, comprises a casing 10 having a plurality of buttons (keys) 11 on its upper side, and a "fence" 12 for laying therein a sheet 13 (shown in FIG. 2*b*) on the buttons. The "fence" forces placing the sheets in a predefined position, i.e., according to the restriction of the "fence".

Upon touching on an impressed figure (not shown in this figure) of the sheet, the key under the sheet is activated. The identification of the key is provided to the control unit, which acts accordingly. For example, if the user activates (e.g., by touching) an expected key, the apparatus sounds a certain audio signal, and if he activates a wrong key, the apparatus sounds a different audio signal.

Figures 3A, 3B, 3C:
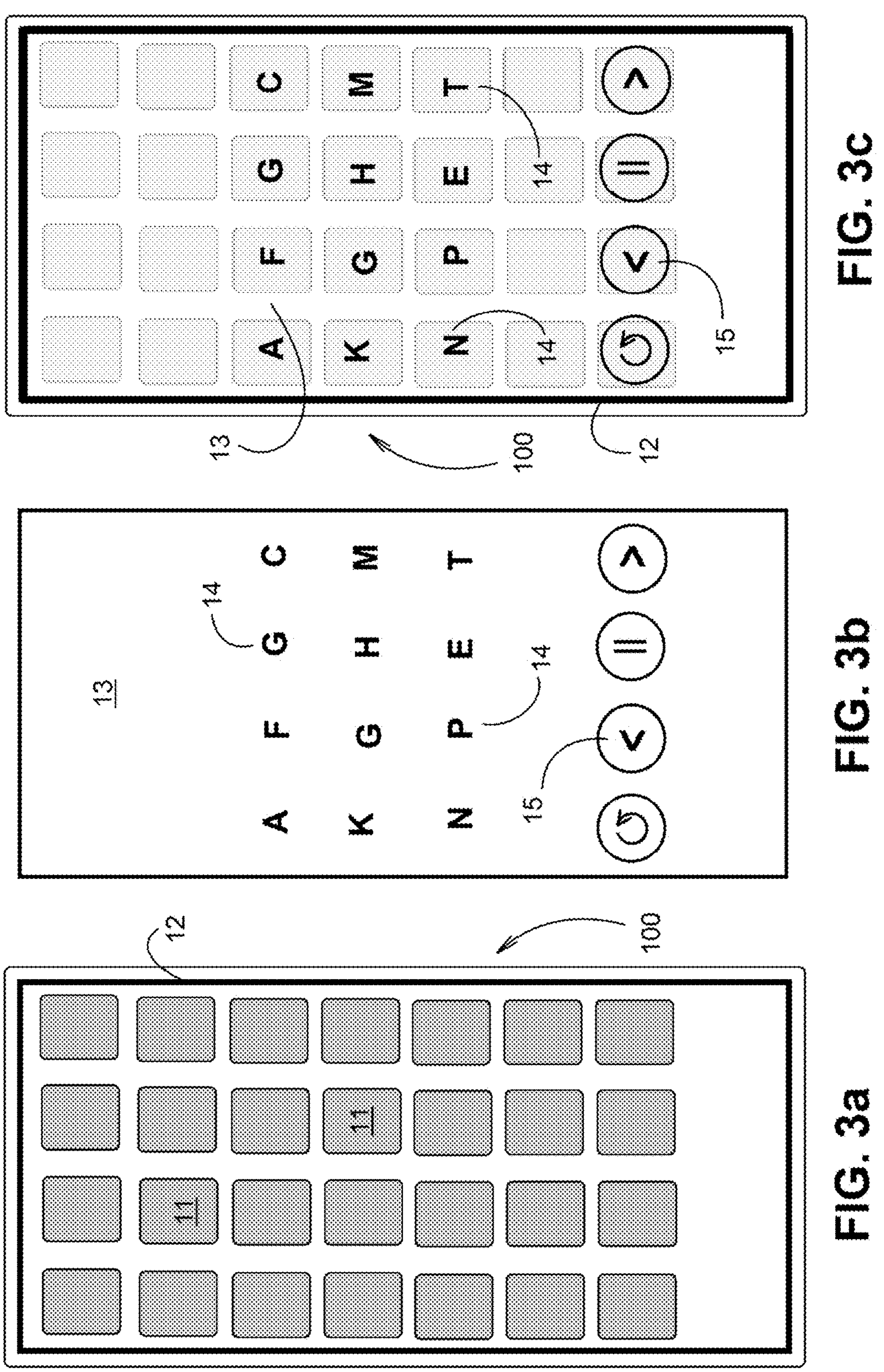
FIG. 3*a* is a top view schematically illustrating a screenless teaching apparatus, according to embodiments of the invention.
FIG. 3*b* schematically illustrating a sheet of a lesson, according to embodiments of the invention.
FIG. 3*c* schematically illustrates the sheet of FIG. 3*b* placed on the apparatus 3*a*, according to embodiments of the invention.

FIG. 3*a* is a top view schematically illustrating a screenless teaching apparatus, according to embodiments of the invention.

The apparatus comprises buttons (keys) 11, surrounded by a "fence" 12. The "fence" forces placing therein a sheet (not shown in this figure) in a predetermined position and forces the sheet to stay in this position as long as the sheet is laid down on the apparatus.

FIG. 3*b* schematically illustrating a sheet of a lesson, according to embodiments of the invention.

The sheet, which is marked herein by reference numeral 13, comprises impressed letters 14, and control icons 15.

FIG. 3*c* schematically illustrates the sheet of FIG. 3*b* placed on the apparatus 3*a*, according to embodiments of the invention.

The sheet 13 is laid down within the "fence" 12. For the sake of demonstration, the sheet is presented as half transparent.

As illustrated, each character 14 is placed on a button (key) 11, so that when a user presses a letter 14 of the sheet 13, also the button 11 underneath is pressed.

As in the computer lesson described above, the apparatus 100 reads aloud a letter (i.e., character) and the student has to activate (touch, press, etc.) with his finger the corresponding instance of the impressed letter on the screen. If the student activates the expected letter, the apparatus 100 sounds a "well done" message.

For the sake of clarity, the term "scene" is defined herein as a question read out load by the apparatus, and a response provided by the student (user) by activating a button (key).

The student may change the lessons course by the control keys. For example, skipping the current scene to the next scene, returning to an earlier lesson, repeating a current scene, pausing a lesson, and so on.

Figure 4B:
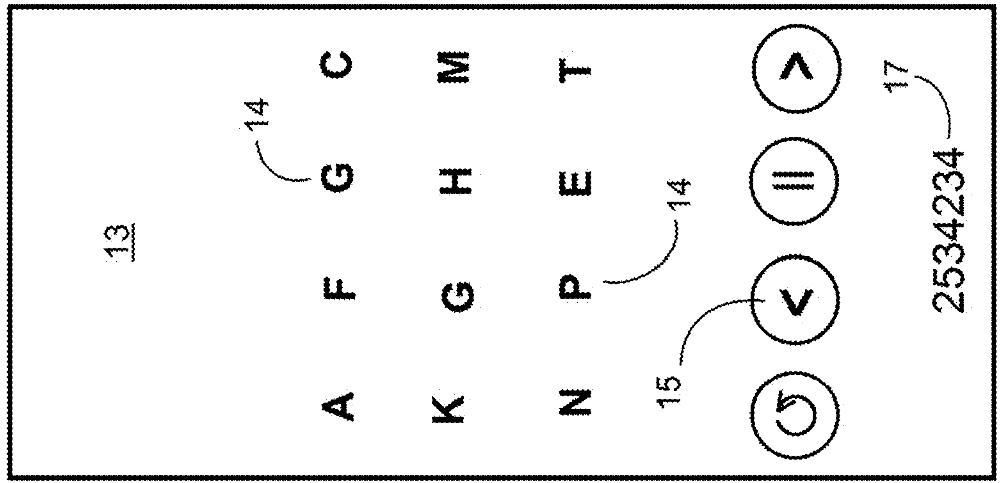
FIG. 4*b* schematically illustrating a sheet of a lesson, according to further embodiments of the invention.
Figure 4A:
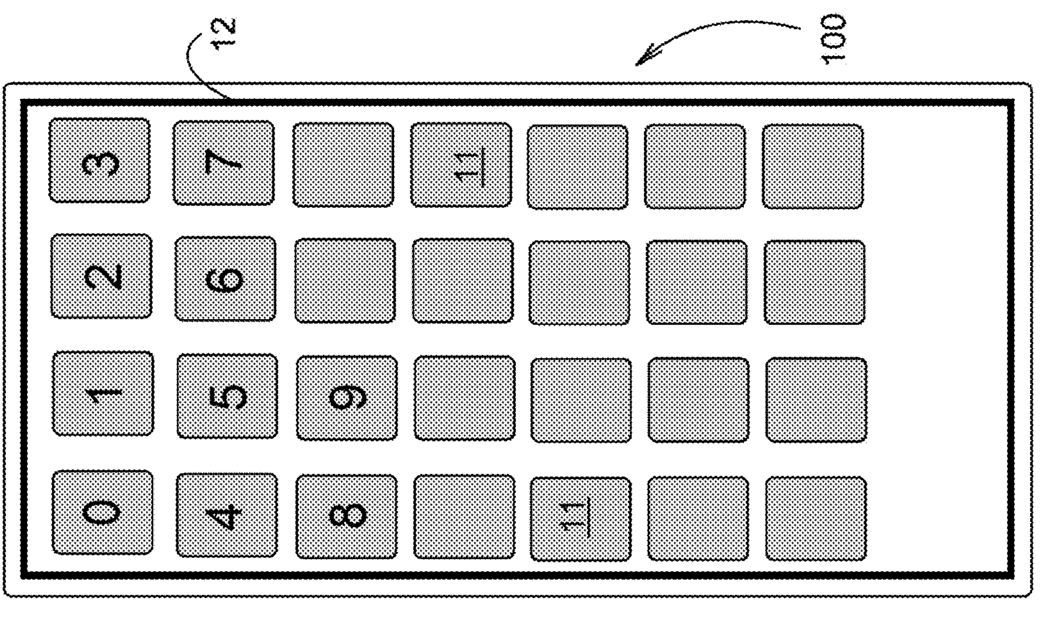
FIG. 4*a* is a top view schematically illustrating a screenless teaching apparatus, according to further embodiments of the invention.

FIG. 4*a* is a top view schematically illustrating a screenless teaching apparatus, according to further embodiments of the invention.

FIG. 4*b* schematically illustrating a sheet of a lesson, according to further embodiments of the invention.

A memory card inserted in a corresponding socket (reader) of the apparatus comprises a plurality of lessons, wherein each lesson is associated with a sheet. Therefore, there is a problem of how to inform the apparatus which sheet is placed on the apparatus.

One solution to this problem is a code (ID) 17 which is identification information of the sheet 13. For example, such code may comprise an ID of the series (e.g., the subject of the lessons) and the ID of a lesson in this series. For example, the ID of the letters practicing lessons, and an ID of the current lesson on the series.

In order to use the apparatus buttons (keys) for inputting this information, i.e., the IDs, the first 10 buttons comprise an impression of a digit from 0 to 9. In order to initiate a lesson, the parent provides the lesson ID by the activating buttons 11 of the apparatus. Then the apparatus confirms that the lesson exists in the memory card or denies it.

Another solution is to use a barcode reader connected to the apparatus, and a barcode impressed on the sheet (not shown). Of course, barcode is merely an example, and other coding technologies can be implemented, such as QR-code.

Figure 5:
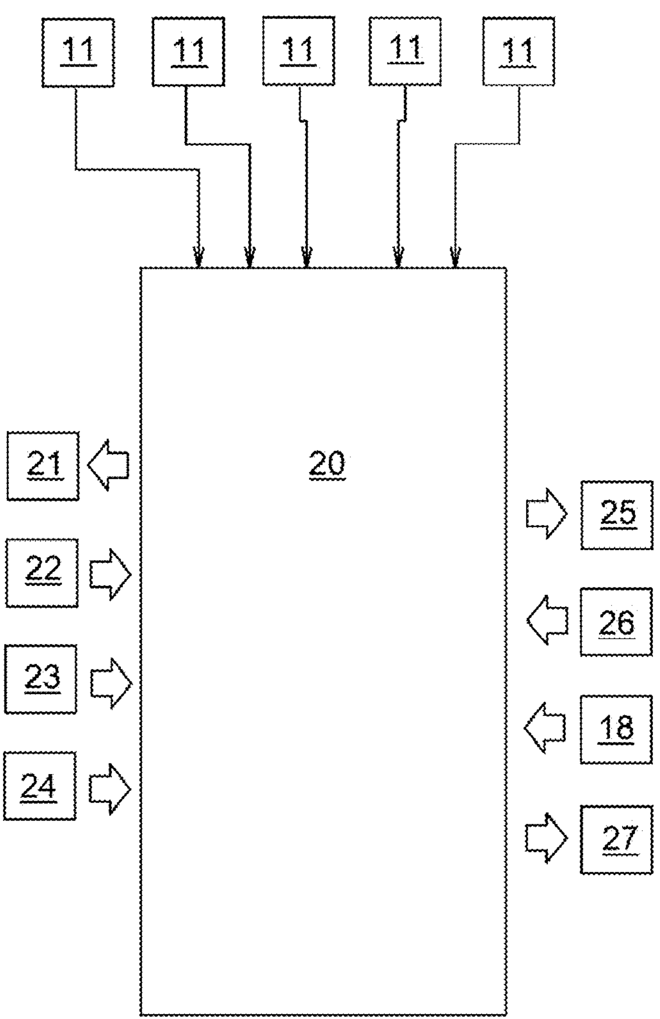
FIG. 5 is a block diagram schematically illustrating an electronic layout of a screenless teaching apparatus, according to embodiments of the invention.

FIG. 5 is a block diagram schematically illustrating an electronic layout of a screenless teaching apparatus, according to embodiments of the invention.

The arrows represent the direction of the data, from the processor 20 or to the processor.

The "brains" of the apparatus is a processor 20, which can be, but not limited to, a CPU and memory which runs an executional code (not illustrated).

The buttons (keys) 11 are connected to the processor, and each time a button is pressed, an indication is transmitted to the processor. The code that runs on the memory of the processor causes a reaction according to the pressed button. For example, if the executional code expects a certain button to be pressed then if the expected button is pressed, the executional code activates the apparatus to play a file which plays an audio signal of the phrase "well done", otherwise it plays a beep sound.

The audio signal can be played via speaker 21 or headphones 25.

The executional code, i.e., an application program, can be loaded into the memory of the processor from a data storage media 22 such as a removable memory card, placed in a corresponding socket of the apparatus.

The illustrated devices shown in this figure are: Processor 20, buttons (keys) 11, speakers 21, data storage media 22 (which may be a CD, any removable memory fixture, and even a remote server accessible via the internet), an on/off switch 23, a charging socket 24, headphones 25, microphone 26, barcode/QR-code reader 18, an interface for connection to the internet.

The microphone may be used as an input device.

A button (key) 11 may be implemented in a plurality of ways. The simplest way is a press button. In order to use this option, the buttons are pressable, such as in a classic computer keyboard.

A more sophisticated way is magnet sensible sensors. Thus, if a finger is close "enough" to the sensor (of a button), the magnetic field near the button is changed, and an indication thereof is provided to the processor. This is a preferable way since the no sheet is wrinkled.

In the figures and/or description herein, the following reference numerals (Reference Signs List) have been mentioned:

numeral 100 denotes a screenless teaching apparatus, according to preferred embodiments of the invention;
10 denotes a casing;
11 denotes a button (key);
12 denotes a "fence" limiting the movement of a sheet placed therein;
13 denotes a sheet;
14 denotes a letter;
15 denotes a control button;
16 denotes a computer display (screen);
17 denotes a sheet ID;
18 denotes a code (e.g., barcode) reader;
19 denotes an indication light;
20 denotes a processor;
21 denotes a speaker;
22 denotes a data storage media (such as a removable memory card, and even a remote server accessible through the internet);
23 denotes an ON/OFF button;
24 denotes a charger/charging socket;
25 denotes headphones;
26 denotes a microphone (which can be used as an input device); and
27 denotes an interface connection to the internet.

The foregoing description and illustrations of the embodiments of the invention have been presented for the purposes of illustration. It is not intended to be exhaustive or to limit the invention to the above description in any form.

Any term that has been defined above and used in the claims should be interpreted according to this definition.

The reference numbers in the claims are not a part of the claims, but rather used for facilitating the reading thereof. These reference numbers should not be interpreted as limiting the claims in any form.

What is claimed is:

1. A screenless teaching apparatus, comprising:

a casing (10) having on an upper side thereof a plurality of buttons (11);

a printed sheet (13) having a plurality of images (14) impressed thereon, the printed sheet being laid down on the upper side of the casing such that each of the images is positioned above a corresponding one of said buttons, and touching an image on the printed sheet activates the corresponding button beneath it, wherein each of said images used as a response to a question;

a data storage media (22), for storing one or more audio questions to each of said responses, wherein each of said buttons is used as indicator to an image pointed by a user;

a processor for displaying each of said questions as an audio signal, receiving a response provided by a user through one of said buttons, and playing audio feedback thereof; and a fence (12) surrounding at least a portion of the upper side of the casing, forcing the printed sheet into a predetermined position and preventing unintentional movement thereof.

2. The apparatus according to claim 1, wherein at least one of said buttons is a mechanic sensor, sensing a mechanical press thereon a user thereto.

3. The apparatus according to claim 1, wherein at least one of said buttons is a proximity sensor, sensing a proximity of a finger of a user thereto.

4. The apparatus according to claim 1, wherein said data storage media is a removable memory card.

5. The apparatus according to claim 1, wherein said data storage media is a compact disk.

6. The apparatus according to claim 1, wherein said data storage media is a remote server accessible through the internet.

7. The apparatus according to claim 1, wherein said sheet further comprise an ID (17) of said sheet.

8. The apparatus according to claim 7, wherein said buttons comprise an impression of a digit, for providing an ID of said sheet to said processor by clicking said buttons correspondingly.

9. The apparatus according to claim 7, wherein said ID is in a form of a code.

10. The apparatus according to claim 9, wherein said code is in a form of barcode.

11. The apparatus according to claim 9, wherein said code is in a form of QR-code.

12. The apparatus according to claim 9, wherein said code is in a form of text and said apparatus comprises a text recognition facility thereof.

13. The apparatus according to claim 1, wherein on said sheet are also impressed functional buttons.

* * * * *